Patented May 13, 1941

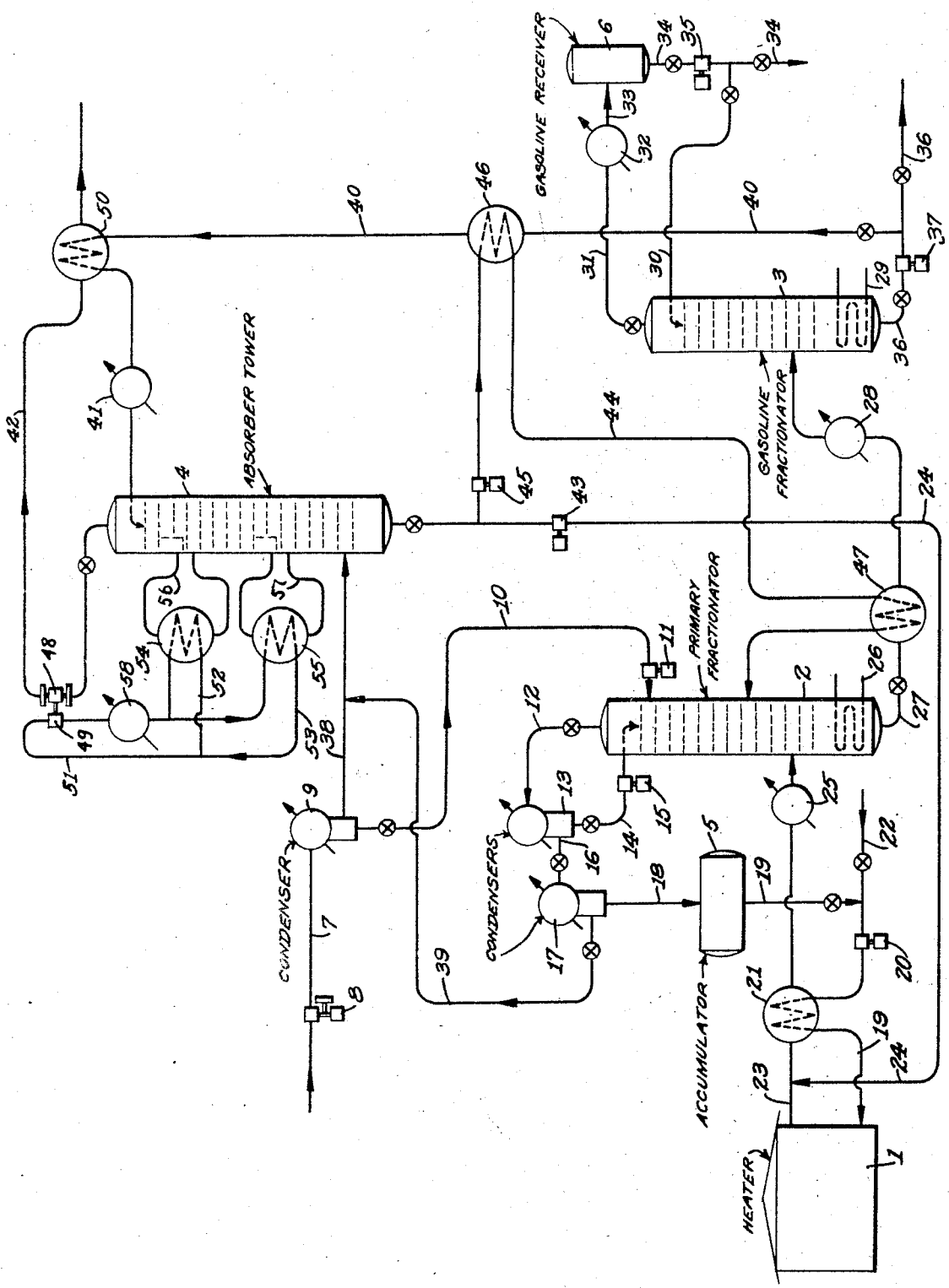

2,241,716

UNITED STATES PATENT OFFICE 2,241,716

CONVERSION OF HYDROCARBONS

George Roberts, Jr., Montclair, N. J., and George W. Robinson, Houston, Tex., assignors to The Polymerization Process Corporation, Jersey City, N. J., a corporation of Delaware Application June 15, 1937, Serial No. 148,275

5 Claims. (Cl. 196—10)

This invention relates to the production of normally liquid hydrocarbons, including gasoline or motor fuel constituents, from normally gaseous hydrocarbons. More particularly, the invention relates to a process for effecting the polymerization or conversion of hydrocarbon gases, such as those produced in oil cracking operations or from natural gas sources, to hydrocarbons of lower boiling point suitable for use as motor fuel.

Normally gaseous hydrocarbons, preferably after the removal of hydrogen and methane and excessive quantities of ethane, may be treated to convert a substantial proportion thereof to normally liquid products by means of a single-stage operation wherein the gases are heated to a temperature of 750° to 1250° F. at pressures in excess of 400 pounds per square inch, or by heating them to higher temperatures for longer periods under lower pressure, or by heating them at lower temperatures and at lower pressure, if desired, in the presence of suitable catalysts. The products of such conversion operations, which may be the result of polymerization or related reactions, include hydrogen, normally gaseous hydrocarbons, and normally liquid hydrocarbons including those which form constituents of gasoline.

In carrying out such a conversion operation the conversion products are ordinarily fractionated to produce a normally gaseous fraction and a normally liquid fraction. The normally liquid fraction is removed for treatment to recover gasoline therefrom, and the normally gaseous fraction is further fractionated to recover any hydrocarbons suitable for further conversion treatment. These hydrocarbons are combined with similar hydrocarbons from an extraneous source and subjected therewith to further conversion treatment.

This invention contemplates preliminary treatment of hydrocarbon gases from any suitable source, such as natural gas, or gas produced in oil cracking such as the overhead gases from a high pressure separator or the reflux from a gasoline stabilizer, to obtain therefrom a charging stock of superior quality and to recover from such gases substantially all the constituents thereof desired or suitable for conversion operations.

It is an object of the present invention to produce an improved operating method and cycle for carrying out a recycling type of gas conversion process including such additional operating results as may be found to obtain.

The invention contemplates the treatment of a hydrocarbon fresh feed such as natural gases or those produced in oil cracking operations, to condense therefrom a fraction predominating in the gaseous hydrocarbons of higher molecular weight, such as the $C_3$ and $C_4$ hydrocarbons. This fraction is thereafter introduced in liquefied condition to the upper portion of the fractionation zone wherein the products of conversion are separated into a normally liquid fraction and a normally gaseous fraction.

The uncondensed portion of the gases under treatment is scrubbed in a zone of relatively high pressure by means of suitable absorption medium which preferably consists of a portion of the liquid products of conversion from which gasoline constituents have been removed. The enriched absorption medium is then admixed with the products of conversion before separation thereof into liquids and gases, or during such separation, or both.

The normally gaseous hydrocarbons dissolved in the absorption medium, the liquefied normally gaseous hydrocarbons introduced to the fractionation zone, and the normally gaseous constituents of the conversion reaction products are recovered together as overhead gases from the zone of fractionation and are subjected to condensation whereby a liquefied fraction predominating in the hydrocarbons most suitable for conversion treatment, such as the $C_3$ and $C_4$ hydrocarbons, is obtained. If necessary, a portion of this fraction may be returned to the upper part of the zone of fractionation as reflux to assist the action of the liquefied hydrocarbons otherwise introduced to said zone, as described above, in maintaining proper temperature conditions in said zone and effecting efficient separation of the gases and liquids. The remainder of said liquefied fraction is passed to an accumulator from which it may be withdrawn as fresh feed for the conversion reaction with or without the addition from an extraneous source of other hydrocarbons suitable for conversion.

The uncondensed portion of the overhead gases from the zone of separation is passed to the above-described high-pressure absorption zone whereby valuable constituents suitable for conversion to normally liquid hydrocarbons are recovered together with similar constituents of the uncondensed portion of the fresh feed to the system described above. The uncondensed gases pass from the scrubbing or absorption zone after removal of valuable constituents therefrom and are expanded through a suitable engine for driving a pump used for circulating cooling liquid used to withdraw the heat of absorption from the liquids passing through the scrubbing zone whereby the proper temperature therein is maintained. The cool expanded gases are used for indirect heat exchange and then passed from the system.

The invention is illustrated in the accompanying drawing in which the figure is a diagrammatic view in elevation of apparatus suitable for carrying out the present invention. It is to be understood, however, that the drawing is illustrative only, the invention being capable of other modifications which may be beyond the physical limitations of the apparatus indicated.

In the drawing, a heater 1 which may be of any suitable construction, fractionators 2 and 3, absorber tower 4, accumulator 5, and gasoline receiver 6 are indicated, together with auxiliary equipment for carrying out the process. Fresh feed, which may include natural gas, or gases produced in connection with oil cracking such as those separated in a high pressure separator or those passed overhead from a gasoline stabilizer or both is introduced to the system through line 7 under pressure produced by means of a compressor 8 in line 7. Line 7 passes to a condenser 9 wherein the gases are suitably cooled or refrigerated to condense a fraction therefrom which predominates in $C_3$ and $C_4$ hydrocarbons. This liquefied fraction is withdrawn from condenser 9 through line 10 by means of pump 11 in line 10 and introduced to the upper portion of a fractionator 2 in which products of gas conversion are separated into normally liquid and normally gaseous hydrocarbons.

By means of the addition of the liquefied hydrocarbons introduced to the fractionator 2 through line 10 conditions of temperature are maintained in the fractionator 2 whereby efficient separation of normally liquid hydrocarbons from normally gaseous hydrocarbons is obtained. In addition to the cooling effect of the evaporation of the liquefied hydrocarbons their presence in the fractionation assists in the separation of liquids and gases. The normally gaseous hydrocarbons in fractionator 2, together with hydrogen, pass overhead through line 12 to a condenser 13 wherein, if necessary, a portion of the gases is condensed and returned to the fractionator 2 through line 14 by means of pump 15 to the upper portion of the fractionator 2 to assist in maintaining proper temperature conditions therein and obtaining efficient separation of normally liquid and normally gaseous hydrocarbons. The uncondensed portion of the gases passing through condenser 13 is withdrawn therefrom through line 16 and passed to a second condenser 17 wherein a further fraction is condensed and separated therefrom. This fraction predominates in hydrocarbons suitable for conversion reactions and represents the major proportion of the hydrocarbons suitable for conversion in the gaseous stream passing through the condenser 17. The liquefied fraction condensed in condenser 17 is withdrawn therefrom through line 18 and passed to an accumulator 5.

It is to be understood, of course, that the function of condensers 13 and 17 could be performed by a single condenser which would accomplish the liquefaction of the hydrocarbons most suitable for conversion reactions in a single operation, with the return, if necessary, of a portion of the liquefied fraction to the fractionator 2 as reflux. However, two fractionators are used in this illustration to simplify presentation of the subject matter.

As desired, a stream of hydrocarbons from accumulator 5 is withdrawn through line 19 by means of pump 20 and passed to heater 1 after being preheated by indirect contact with the products of conversion in heat exchanger 21. If desired, additional hydrocarbons suitable for conversion may be introduced to the system from an extraneous source through line 22 which connects with line 19.

In the heater 1 the hydrocarbons are maintained under conditions of temperature and pressure suitable for conversion of at least a portion thereof to normally liquid hydrocarbons. The conditions of conversion will depend upon the nature of the liquids desired and the constituents of the feed. For example, the hydrocarbons may be heated to a temperature of 750° to 1250° F. under a pressure of at least 400 pounds per square inch, such as between 400–3000 pounds per square inch. As a specific example, the gases may be heated under 1200 pounds per square inch pressure and to an exit temperature of 1030° F.

The products of conversion emerge from the heater 1 through line 23 and are cooled by admixture with an absorption medium containing dissolved therein normally gaseous hydrocarbons which is introduced to line 23 through line 24. The mixture of conversion reaction products and absorption medium then passes through line 23 in indirect heat exchange with the fresh feed in heat exchanger 21 and is introduced to the primary fractionator 2 after being further cooled, if desired, by passage through cooler 25.

In the fractionator 2 conditions of temperature and pressure are maintained to separate normally liquid hydrocarbons from normally gaseous hydrocarbons and hydrogen. Heating means 26 may be provided in the bottom of the fractionator 2 for heating the liquids accumulating at that point to prevent the absorption of undesired normally gaseous hydrocarbons and strip the liquids of absorbed normally gaseous hydrocarbons which are undesired therein. The cooling of the gases which ascend to the upper portion of the fractionator 2 to condense therefrom normally liquid hydrocarbons is accomplished largely through the introduction at this point through line 10 of the liquefied fraction of the fresh feed to the system. Further cooling of this portion of the fractionator 2 may be accomplished by the introduction of reflux through line 14, as described above. If desired, however, other cooling means may be used in addition to or instead of this reflux. For example, the fractionator 2 may be maintained at a pressure of 350 pounds per square inch with top and bottom temperatures of 170° F. and 550° F., respectively.

The liquids collected at the bottom of the fractionator 2 are withdrawn therefrom as desired through line 27 and are passed to a gasoline fractionator 3 after being cooled by suitable heat exchange and, if desired, by passage through cooler 28. In the fractionator 3 conditions of temperature and pressure are maintained to separate overhead as vapors the gasoline constituents from higher boiling hydrocarbons which collect in the bottom of the fractionator 3 as liquids. Heating means 29 may be provided at the bottom of the fractionator 3 to heat the liquids which collect at that point to prevent absorption therein of gasoline constituents or to strip therefrom dissolved gasoline constituents. The vapors which ascend to the top of the fractionator 3 may be cooled by suitable means, for example, by means of the introduction of reflux through line 30 to condense and remove therefrom liquid constituents undesired in the gasoline fraction.

The uncondensed vapors pass overhead from the fractionator 3 through line 31 to cooler 32 wherein the vapors are condensed. The liquids from cooler 32 then pass through line 33 to gasoline receiver 6. Gasoline is withdrawn from receiver 6 as desired through line 34 by means of pump 35. If desired, a portion of the gasoline passing through line 34 may be diverted through line 30 which connects therewith for return to the fractionator 3 to assist in cooling the upper portion of the fractionator.

The liquids which collect in the bottom of the fractionator 3 are withdrawn as desired through line 36 by means of pump 37 and passed from the system for treatment elsewhere, for example, in an oil cracking operation.

The uncondensed gases from condenser 9 are withdrawn therefrom through line 38 and introduced to absorber tower 4 which may be maintained under relatively high pressure, for example, approximately 375 pounds per square inch. The uncondensed gases from condenser 17 may also be passed to the absorber tower 4, for example, through line 39 which connects with line 38.

A suitable absorption medium is introduced into the upper portion of the absorber tower 4 to scrub the ascending gases to recover therefrom valuable constituents suitable for conversion to normally liquid hydrocarbons. For use as an absorption medium a portion of the liquids withdrawn from the bottom of fractionator 3 through line 36 may be diverted through line 40 and introduced thereby to the upper portion of the absorber tower 4 after being cooled by suitable heat exchange and, if desired, by passage through cooler 41. This oil ordinarily consists of gas oil, together with a small proportion of heavier hydrocarbon oils, and is an efficient absorption medium for use in scrubbing the gases to recover valuable constituents. If desired, the heavier hydrocarbon oils may be separated from the gas oil, and only the latter alone or admixed with similar oil from an outside source may be used as the absorbent.

The absorber tower 4 is provided with suitable trays or plates and other gas and liquid contact means whereby the ascending gases are brought into intimate contact with the descending absorption medium to effect a substantially complete removal from the gases of all constituents suitable for conversion reactions.

The scrubbed gases are withdrawn from the top of the absorber tower 4 through line 42 and are expanded through a suitable engine 48 which is coupled to a pump 49 whereby the expansion of the gases operates the pump. The expanded gases having done work in driving engine 48 are substantially cooled and are conducted through line 42 to heat exchanger 50 wherein they serve to further cool the absorbent medium passing through line 40 to absorber tower 4. After this heat exchange the gases may be passed from the system for use elsewhere, for example, as fuel.

The pump 49 is located in line 51 and serves to circulate cooling liquid through line 51, and lines 52 and 53, which are connected in parallel to line 51 and pass through heat exchangers 54 and 55, respectively, wherein it serves to cool part of the absorbent medium from absorber tower 4, which is circulated through the heat exchangers 54 and 55 by means of lines 56 and 57, respectively. In this manner the heat of absorption developed in absorber tower 4 is withdrawn by means of the cooling liquid circulated through lines 51, 52 and 53, and the low temperature necessary for efficient absorption is maintained in the absorber tower 4. A cooler 58, which may represent suitable heat exchange with cool fluid from another part of the system, is provided in line 51 to maintain the minimum temperature desired in the cooling liquid circulated therethrough. For purposes of illustration two heat exchangers, 54 and 55, are described for cooling the absorbent medium in tower 4. It is apparent, however, that any suitable number of cooling means may be provided for withdrawing the heat of absorption and maintaining the temperature desired in the tower 4.

The enriched absorption medium containing dissolved normally liquid hydrocarbons collects in the bottom of absorber tower 4 and is withdrawn as desired through line 24 by means of pump 43 and passed to admixture with the hot conversion products in line 23 as described above.

As a modification a portion of the enriched absorption medium passing through line 24 may be diverted through line 44 by means of pump 45 and introduced to the fractionator 2 wherein it assists in maintaining proper temperature conditions, and separation of the dissolved normally gaseous hydrocarbons is accomplished, which separated gases are recovered together with the similar constituents contained in the material introduced to the fractionator 2 through lines 10, 14 and 23. It may be desirable to heat this stream of absorption medium by heat exchange with the fresh absorption medium in line 40 and the primary fractionator bottoms in line 27 by means of heat exchangers 46 and 47 respectively. This is a particularly advantageous step when the amount of absorption medium used in recovering valuable constituents from the uncondensed gases is more than the amount desired to be mixed with the conversion reaction products prior to separation of liquids and gases.

It is understood that the functions of the fractionators 2 and 3 could be performed by a single structure provided with suitable trap-out trays, etc., but in order to simplify presentation of the subject matter of the invention separate structures are illustrated. These fractionators are equipped with suitable bubble caps, plates or other gas and liquid contact means to assist in the intimate contact of liquids and gases therein whereby condensation, evaporation, absorption, stripping and other operations incidental to fractionation are assisted.

It is to be understood that the invention is not limited to the modifications described herein as illustrations but is capable of other modifications which may be beyond the physical limitations of the apparatus described in connection with said illustrations.

We claim:

1. The process of producing normally liquid hydrocarbons from normally gaseous hydrocarbons which comprises heating a stream of normally gaseous hydrocarbons predominating in convertible constituents under appropriate pressure to effect conversion to normally liquid hydrocarbons, fractionating the products of conversion to produce therefrom a normally liquid fraction and a normally gaseous fraction, introducing to the system as fresh feed a stream of normally gaseous hydrocarbons, cooling said stream to separate therefrom a liquid fraction predominating in convertible constituents, admixing said liquid fraction with said products of conversion during the separation thereof into normally liquid and normally gaseous constituents, cooling the normally gaseous fraction resulting from said separation of the products of conversion to condense therefrom a liquid fraction predominating in hydrocarbons suitable for conversion, passing said liquid fraction to admixture with said stream undergoing conversion, passing the uncondensed portion of the normally gaseous fraction from the products of conversion and the uncondensed portion of the stream of normally gaseous hydrocarbons introduced to the system as fresh feed to a scrubbing zone, maintaining said scrubbing zone under relatively high pressure, fractionating the normally liquid fraction resulting from the separation of the products of conversion to separate therefrom gasoline constituents, introducing at least a portion of the remaining heavier oils of said liquid fraction into said scrubbing zone as absorbent medium and into intimate contact with the gases passing therethrough whereby convertible constituents contained in said gases are absorbed by said heavier oil, withdrawing the absorbent medium containing normally gaseous hydrocarbons dissolved therein from said scrubbing zone and admixing at least a portion thereof with the products of conversion, circulating a stream of cooling medium from an extraneous source into indirect heat exchange with portions of the absorbent medium in said scrubbing zone to cool said absorbent medium in said scrubbing zone, withdrawing the scrubbed gases from said high pressure scrubbing zone, expanding said gases, and utilizing said expansion to circulate said cooling medium into indirect heat exchange with said absorbent medium.

2. In a process for producing normally liquid hydrocarbons from normally gaseous hydrocarbons wherein said normally gaseous hydrocarbons are subjected to elevated conditions of temperature and pressure to effect conversion into normally liquid hydrocarbons and the products of conversion are separated into said normally liquid products and normally gaseous hydrocarbons, the improvement which comprises passing at least a portion of the normally gaseous hydrocarbons separated from the products of conversion through a scrubbing zone under pressure wherein said gases are contacted with a liquid absorbent medium to scrub therefrom convertible constituents which are recovered by solution in said absorbent medium, circulating a stream of cooling fluid from an extraneous source into indirect heat exchange with portions of the absorbent medium in said scrubbing zone to cool said absorbent medium in said scrubbing zone, withdrawing the scrubbed gases from said scrubbing zone, expanding said gases and utilizing said expansion to circulate said cooling fluid into indirect heat exchange with said absorbent medium.

3. A process in accordance with claim 2 wherein the said expanded gases are passed in indirect heat exchange with the said liquid absorbent medium to effect cooling of the latter.

4. A process in accordance with claim 2 wherein the said expanded gases are passed in indirect heat exchange with the said liquid absorbent medium to effect cooling of the latter prior to introduction of the said liquid absorbent medium into said scrubbing zone.

5. In a process for producing normally liquid hydrocarbons from normally gaseous hydrocarbons wherein normally gaseous hydrocarbons are heated at appropriate pressure to effect conversion of a portion thereof to normally liquid hydrocarbons and the liquid and gaseous products of conversion are fractionated to separate therefrom a gasoline product and a normally gaseous fraction for recycling to the conversion treatment, the improvement which comprises passing a gaseous stream containing normally gaseous hydrocarbons suitable as feed gases for said conversion treatment through a scrubbing zone under pressure, passing a hydrocarbon oil through said scrubbing zone in intimate contact with said gaseous stream as an absorbent medium whereby said normally gaseous hydrocarbons suitable as feed gases for said conversion treatment are absorbed in said hydrocarbon oil, circulating a stream of cooling fluid from an extraneous source into indirect heat exchange with portions of the hydrocarbon oil absorbent medium in said scrubbing zone to cool said absorbent medium in said scrubbing zone, withdrawing the scrubbed gases from said scrubbing zone, expanding said gases, utilizing said expansion to circulate said cooling fluid into indirect heat exchange with said absorbent medium, withdrawing the enriched hydrocarbon oil from said scrubbing zone and contacting at least a portion of said enriched hydrocarbon oil absorbent medium with the liquid and gaseous products of conversion whereby normally liquid hydrocarbons contained in said enriched hydrocarbon oil absorbent medium are recovered by means of the fractionation treatment of said conversion products in said normally gaseous fraction for recycling to the conversion treatment.

GEORGE ROBERTS, Jr.
GEORGE W. ROBINSON.